United States Patent
Porte et al.

(10) Patent No.: US 12,030,659 B2
(45) Date of Patent: Jul. 9, 2024

(54) ANTERIOR PART OF A NACELLE FOR AN AIRCRAFT PROPULSION ASSEMBLY, WHOSE FRONT FRAME IS CONNECTED TO AN OUTER WALL WITHOUT PENETRATING IT

(71) Applicant: Airbus Operations SAS, Toulouse (FR)

(72) Inventors: Alain Porte, Toulouse (FR); Jacques Lalane, Toulouse (FR); Frédéric Vinches, Toulouse (FR); Gregory Albet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 298 days.

(21) Appl. No.: 16/990,214

(22) Filed: Aug. 11, 2020

(65) Prior Publication Data
US 2021/0107669 A1 Apr. 15, 2021

(30) Foreign Application Priority Data
Aug. 13, 2019 (FR) ...................................... 1909180

(51) Int. Cl.
*B64D 33/02* (2006.01)
(52) U.S. Cl.
CPC ...... *B64D 33/02* (2013.01); *B64D 2033/0206* (2013.01)
(58) Field of Classification Search
CPC ... B64D 33/02; B64D 2033/0233; F02C 7/04; F02C 7/047; F01D 25/02
See application file for complete search history.

(56) References Cited

U.S. PATENT DOCUMENTS

| | | | | |
|---|---|---|---|---|
| 6,328,258 B1 * | 12/2001 | Porte | ...................... | F02C 7/045 244/62 |
| 7,980,515 B2 * | 7/2011 | Hunter | .................. | B64C 23/069 244/198 |
| 9,102,394 B2 * | 8/2015 | Schlipf | ..................... | B64C 3/28 |
| 9,896,190 B1 * | 2/2018 | Amorosi | .................. | B64C 3/14 |

(Continued)

FOREIGN PATENT DOCUMENTS

| EP | 2578496 A2 | 4/2013 |
|---|---|---|
| FR | 3074149 A1 | 5/2019 |

OTHER PUBLICATIONS

French Search Report; priority document.

*Primary Examiner* — Richard Green
*Assistant Examiner* — Arfan Y. Sinaki
(74) *Attorney, Agent, or Firm* — Greer, Burns & Crain, Ltd.

(57) ABSTRACT

An anterior part of a nacelle of an aircraft propulsion assembly, which comprises an air intake lip, an outer panel extending an outer part of the air intake lip, an inner structure extending an inner part of the air intake lip, a front frame connecting the outer wall to the air intake lip or to the inner structure. The outer panel and the outer part of the air intake lip together form an outer wall of the anterior part. The front frame and the outer wall are connected to one another by assembly means located inside the anterior part. The anterior part constituted in this manner ensures laminar flow of the air on an outer surface of the anterior part and reduces drag. A nacelle of a propulsion unit, comprising an anterior part of this kind is also provided.

15 Claims, 5 Drawing Sheets

(56) References Cited

U.S. PATENT DOCUMENTS

| | | | |
|---|---|---|---|
| 10,221,765 B2* | 3/2019 | Alstad | F02C 7/045 |
| 2001/0003897 A1* | 6/2001 | Porte | B64D 33/02 |
| | | | 137/15.1 |
| 2010/0065687 A1* | 3/2010 | Douglas | B64C 3/28 |
| | | | 244/130 |
| 2011/0131945 A1* | 6/2011 | Vauchel | B64D 33/02 |
| | | | 428/116 |
| 2012/0126062 A1* | 5/2012 | Stewart, III | B64D 33/02 |
| | | | 29/525.01 |
| 2013/0224000 A1 | 8/2013 | Porte et al. | |
| 2018/0201387 A1* | 7/2018 | Porte | F02C 7/045 |
| 2019/0193833 A1* | 6/2019 | Vinches | B64D 33/02 |
| 2019/0195085 A1* | 6/2019 | Vinches | B64D 33/02 |
| 2020/0031487 A1* | 1/2020 | Wittman | F02C 7/05 |
| 2020/0290747 A1* | 9/2020 | Delsol | B64C 3/28 |

\* cited by examiner

ANTERIOR PART OF A NACELLE FOR AN AIRCRAFT PROPULSION ASSEMBLY, WHOSE FRONT FRAME IS CONNECTED TO AN OUTER WALL WITHOUT PENETRATING IT

CROSS-REFERENCES TO RELATED APPLICATIONS

This application claims the benefit of the French patent application No. 1909180 filed on Aug. 13, 2019, the entire disclosures of which are incorporated herein by way of reference.

FIELD OF THE INVENTION

The present invention relates to aircraft propulsion assemblies and more particularly the nacelles of aircraft propulsion assemblies.

BACKGROUND OF THE INVENTION

A propulsion assembly is a device for generating thrust, which constitutes the motive force of the aircraft equipped with the propulsion assembly. An aircraft propulsion assembly is shown by way of example in FIG. 1.

An example of a conventional installation of a nacelle N of a propulsion assembly on an aircraft A is shown in FIG. 2.

The nacelle conventionally has an anterior part P1 forming an air inlet. The anterior part P1 has the role of collecting air so as to ensure even flow towards the fan. The nacelle also has a main part P2 constituting the rest of the nacelle.

The propulsion assembly generally extends about an axis referred to in the following as the longitudinal axis L. As a result of the substantially cylindrical shape that the nacelle generally has about the longitudinal axis L, any straight line that intersects the axis L in a manner perpendicular thereto is referred to as radial.

A conventional structure of an anterior part P1 of a nacelle of an aircraft propulsion assembly, as is known from the prior art, is described with reference to FIG. 3.

The anterior part P1 of the nacelle comprises an air intake lip 1, which may be annular or substantially annular and is disposed at the front end thereof. The air intake lip 1 comprises a leading edge 10 that can be circular or essentially circular. Leading edge is understood to mean the edge of the air intake lip that is furthest forwards when the nacelle is mounted, and that separates the suction side from the pressure side of the aerodynamic profile of the nacelle. The leading edge 10 generally constitutes the line at the front of the nacelle where the radius of curvature of the surface of the nacelle is minimal.

The air intake lip 1 comprises two parts, an inner part 11 and an outer part 12, that are delimited by the leading edge. In the examples illustrated, the outer and inner parts are substantially symmetrical with respect to the leading edge 10. Of course, in another example, the outer part 12 may have a section larger than that of the inner part 11, or vice versa.

Throughout the present document, the concepts of "front" and "rear", of "anterior" and "posterior", and of "upstream" and "downstream" are to be understood with reference to the direction of the flow of air in the propulsion assembly. Thus, the air enters through the front of the propulsion assembly, that is to say through the anterior part P1 of the nacelle, and leaves (after some of the air has been used as oxidant) through the rear of the propulsion assembly, that is to say through the rear end of the main part P2.

Furthermore, throughout the present document, an "outer" element denotes an element that is radially remote from the longitudinal axis L, typically forming the boundary of the overall volume of the nacelle, while an "inner" element denotes an element that is close to the longitudinal axis L. For example, the primary and secondary flows of an aircraft propulsion assembly flow in the inner duct formed by the nacelle of the propulsion assembly.

The concept of internal (as opposed to the concept of external) to the nacelle denotes the region situated in the thickness of the aerodynamic profile forming the nacelle.

According to the conventional structure of an anterior part P1 of the propulsion assembly, a front frame 2 is disposed at the rear of the air intake lip 1. The assembly formed by the air intake lip 1 and the front frame 2, referred to as the "D-duct" assembly owing to its D-shaped cross section, generally provides a de-icing function using hot air conveyed from the engine through a supply tube inside this assembly.

An inner structure 3 extends the inner part 11 of the air intake lip 1 towards the rear. The inner structure 3 may correspond to a soundproofing panel or any other form of wall defining a duct channeling the air in the direction of the motor situated in the main part of the nacelle.

An outer panel 4 extends the outer part 12 of the air intake lip 1 towards the rear.

Hereinbelow, the assembly formed by the outer part 12 of the air intake lip 1 and the outer panel 4 will be referred to as the outer wall.

In the present document, a distinction is drawn between the air intake lip 1 and the outer panel 4, and the presented embodiments of the invention comprise an outer wall formed of two distinct parts (specifically the outer part 12 of the air intake lip 1 and the outer panel 4) that are connected to one another by assembly means. However, in certain embodiments, the outer wall can be in one piece such that the air intake lip 1 and the outer panel 4 constitute two portions of a single piece referred to as the outer wall.

The front frame 2 comprises a first peripheral edge 21 and a second peripheral edge 22. The first peripheral edge 21 is fastened to the outer wall of the anterior part and the second peripheral edge 22 is fastened to the inner structure 3.

A stiffening frame 5, also referred to as the rear frame, defines the boundary between the anterior part P1 and the main part P2 of the nacelle.

The present invention relates in particular to the connection between the front frame 2 and the outer wall. This connection is realized on peripheral fastening lines or peripheral lines of assembly means 6 that may be termed "orbital seams", by riveting the front frame 2 through the thickness of the outer wall.

In practice, the air intake lip 1 or the outer panel 4 are riveted to the peripheral edge 21 of the front frame 2. Optionally, the rivets 6 may form a common rigid connection between the air intake lip 1, the outer panel 4 and the front frame 2.

Nonetheless, the rivets which are used in the connection between the front frame 2 and the outer panel 4 form irregularities on an outer surface of the nacelle, which can disrupt the flow of air. In particular, the laminar nature of the flow on the outer surface of the nacelle can be locally disrupted by the rivets 6, which by their nature form slight dimples and/or bumps on the aerodynamic surface. More generally, any radial and/or axial discontinuity at the outer surface of the nacelle or at the interface between two panels or assemblies of an aerodynamic surface is likely to disrupt the smooth sliding of the layers of air over the aerodynamic surface.

Any disruption of the laminar nature of the flow of air can give rise to additional drag, which reduces the energy efficiency of the aircraft in question. In particular, for the anterior part of a nacelle of an aircraft propulsion unit, also referred to as the air intake, the connection between the front frame and the outer wall constitutes one of the first physical interruptions of the aerodynamic lines of the nacelle, and an important source of parasitic drag.

The invention aims to reduce the aerodynamic disturbances on the anterior part of a nacelle of an aircraft propulsion unit by optimizing the connection between the front frame and the outer wall.

Document US201113945 describes an air intake structure in which an internal partition 9 is fastened to the outer wall by means of a connection element of the stiffener or structural skin type filled with a porous material, which have the disadvantage of making the outer wall heavier and stiffer. Moreover, at high operating temperatures, the glue for fastening the stiffener weakens and it is proposed to use a porous material to improve adhesion to the outer wall.

SUMMARY OF THE INVENTION

Thus, the invention relates to an anterior part of a nacelle of an aircraft propulsion assembly, the anterior part having a front end that allows air to enter and a rear end that is intended to be connected to the rest of the nacelle, the anterior part comprising:
an air intake lip disposed at the front end and comprising a leading edge and an outer part and an inner part that are delimited by the leading edge,
an outer panel that extends the outer part of the air intake lip, the outer panel and the outer part of the air intake lip together forming an outer wall of the anterior part,
an inner structure extending the inner part of the air intake lip,
a front frame disposed behind the air intake lip and connecting the outer wall to the inner structure, the front frame comprising a first peripheral edge connected to the outer wall, and a second peripheral edge connected to the inner structure and/or to the inner part of the air intake lip, According to the invention, the front frame and an element for mounting the outer wall of the anterior part are connected to one another by assembly means located inside the anterior part such that the assembly means do not penetrate the outer wall. The mounting element takes the form of a bracket or a fastening tab.

The anterior part formed in this manner, and, in particular, the connection between the front frame and the outer wall by assembly means situated inside the anterior part, serves to ensure the continuity of the aerodynamic surface of the anterior part of the nacelle. This ensures laminar flow of the air on the outer surface of the anterior part and reduces drag. Moreover, the tab or bracket shape serves to make the structure more lightweight and to avoid stiffening the outer wall in order to remain the laminar flow in the event of deformation.

The outer wall may comprise a mounting element extending inside the anterior part and projecting from an inner surface of the anterior part, the first peripheral edge of the front frame being connected to the mounting element by the assembly means.

The mounting element may be a piece added to the outer wall, and assembled to the outer wall by non-penetrating fastening means, for example by welding or soldering.

The mounting element may be formed in one piece with the air intake lip or the outer panel, or the air intake lip and the outer panel.

The mounting element may be a bracket, a stiffener element or a fastening tab.

The assembly means may be added fastening elements, for example rivets.

The first peripheral edge of the front frame may be connected to the outer wall by welding, soldering or gluing, the welding, soldering or gluing forming the assembly means.

The outer wall may comprise a recess configured to receive and hold fast the first peripheral edge of the front frame by way of matching shapes, the recess forming at least part of the assembly means. The front frame may comprise at least two radial parts, the radial parts being joined to one another by removable fastening elements.

The invention also relates to an anterior part of a nacelle of a propulsion assembly of an aircraft (A), the anterior part (P1) having a front end allowing air to enter and a rear end intended to be connected to the rest of the nacelle, the anterior part comprising:
an air intake lip disposed at the front end and comprising a leading edge and an outer part and an inner part that are delimited by the leading edge,
an outer panel that extends the outer part of the air intake lip, the outer panel and the outer part of the air intake lip together forming an outer wall of the anterior part (P1),
an inner structure extending the inner part of the air intake lip,
a front frame disposed behind the air intake lip and connecting the outer wall to the air intake lip or to the inner structure, the front frame comprising a first peripheral edge connected to the outer wall, and a second peripheral edge connected to the inner structure and/or to the inner part of the air intake lip,
characterized in that the outer wall comprises a mounting element, the mounting element being formed in one piece with the air intake lip or the outer panel or the air intake lip and the outer panel, the front frame and the mounting element of the outer wall of the anterior part (P1) being connected to one another by assembly means located in an inner zone of the anterior part (P1) such that the assembly means do not penetrate the outer wall.

By virtue of the mounting element being created in one piece, the problem of fastening by gluing is avoided and a simple alternative to the use of a porous material as in the prior art is provided.

According to the invention, in this nacelle anterior part, the outer wall comprises a mounting element extending inside the anterior part (P1) and projecting from an inner surface of the anterior part (P1), the first peripheral edge of the front frame being connected to the mounting element by the assembly means.

In this nacelle anterior part, the mounting element is a bracket, a stiffener element or a fastening tab.

The assembly means are added fastening elements, for example rivets.

The first peripheral edge of the front frame is connected to the outer wall by welding, soldering or gluing, the welding, soldering or gluing forming the assembly means.

The front frame comprises at least two radial parts, the radial parts being joined to one another by removable fastening elements.

The mounting element is a connecting tab formed in the outer panel having a Y shape and the lip and the outer panel being assembled by nesting.

The invention also relates to a nacelle of an aircraft propulsion unit, having an anterior part having the above features.

BRIEF DESCRIPTION OF THE DRAWINGS

Other particular features and advantages of the invention will become more apparent in the description below, with reference to the appended drawings, which are given by way of non-limiting examples.

DETAILED DESCRIPTION OF THE PREFERRED EMBODIMENTS

Figure 1:
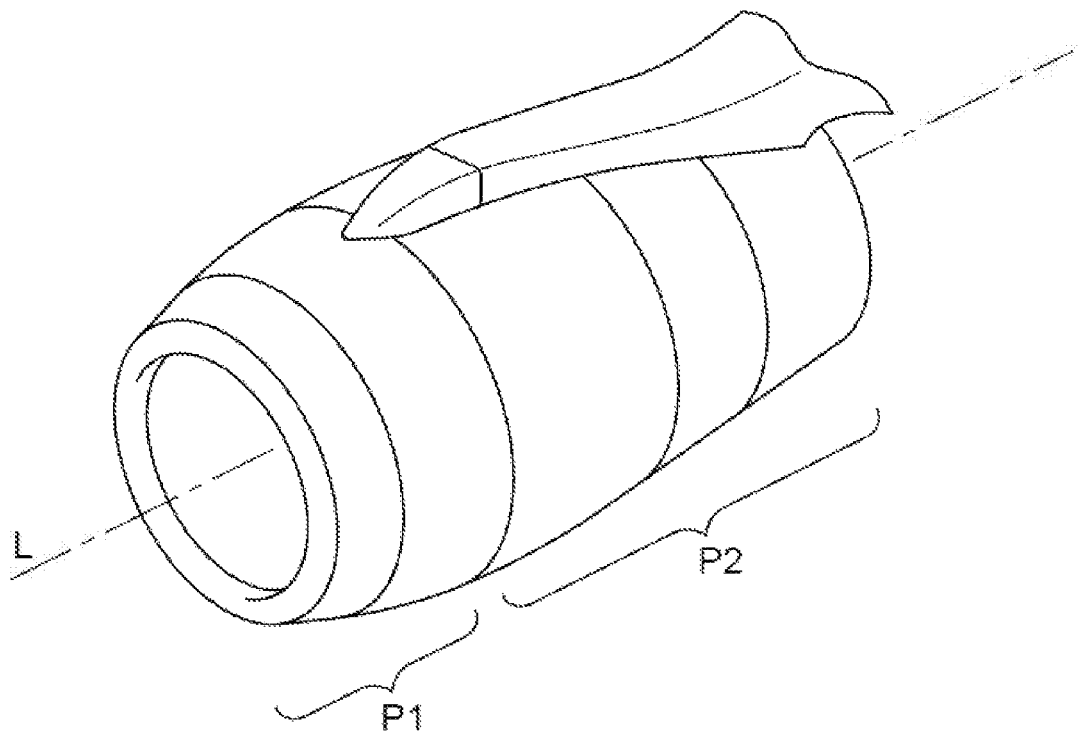
FIG. 1 shows an aircraft propulsion assembly in a schematic three-dimensional view.
Figure 2:
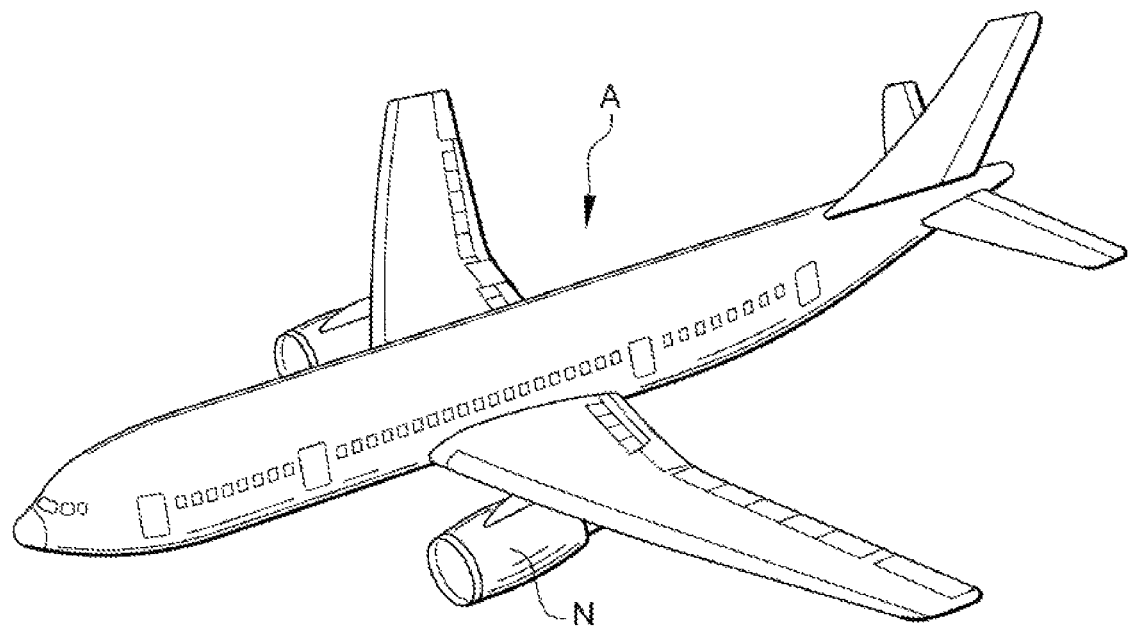
FIG. 2 shows an aircraft in a schematic three-dimensional view.
Figure 3:
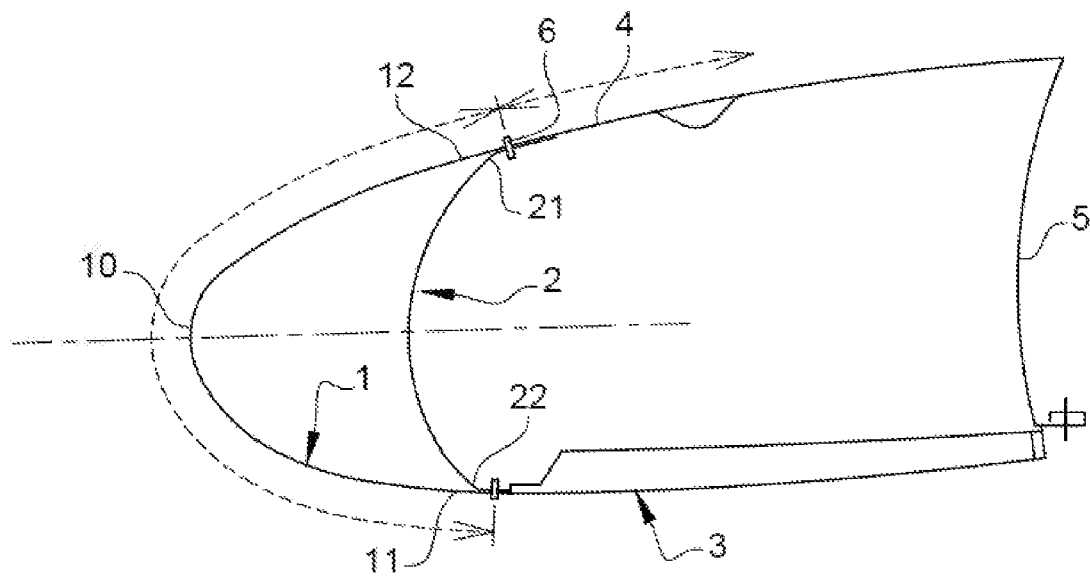
FIG. 3 shows, in a cross-sectional partial concept view, an anterior part of a nacelle of an aircraft propulsion assembly in accordance with the prior art.
Figure 4:
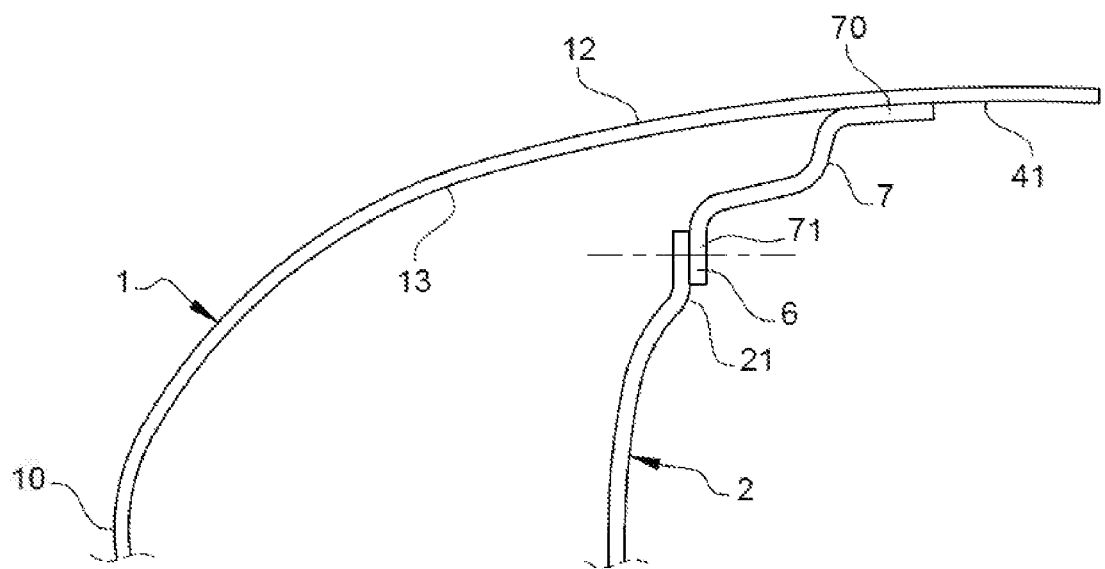
FIGS. 4 to 9 show, in detail cross-sectional views, examples of assemblies between a front frame and an outer wall of a nacelle anterior part, each example being in accordance with a different embodiment.

FIGS. 1 to 3, which present general features of aircraft propulsion assemblies and a configuration of a nacelle anterior part in accordance with the prior art, were described above in the preamble of the present document. The same references as those used in the description of FIGS. 1 to 3 are used to denote the same elements in the remainder of the present description. FIG. 4 shows a first example of a connection between the front frame 2 and the outer wall of the nacelle anterior part according to the invention. In this example, the outer wall comprises a mounting element 7.

The mounting element 7 projects from an inner surface of the outer wall. Thus, the mounting element 7 extends inside the anterior part. The inner zone of the anterior part is to be understood as the zone situated in the thickness of the aerodynamic profile, that is to say the zone delimited by the outer surface (in contact with the flow of air) of the anterior part. In other words, the outer surface of the anterior part delimits the inner zone of the anterior part.

The mounting element 7 may project from an inner surface 13 of the outer part 12 of the lip 1, or from an inner surface 41 of the outer panel 4, or both from the inner surface 13 of the outer part 12 and the inner surface 41 of the outer panel 4.

In this first example, the mounting element 7 is an added piece. In other words, the mounting element 7 is formed separately from the outer wall, for example by machining or additive manufacturing, in particular 3D printing. The mounting element 7 is connected to the outer wall by fastening means. In particular, the mounting element 7 is connected to one edge of the lip 1, or to the inner surface 41 of the outer panel 4, or both to the lip 1 and to the outer panel 4. The fastening means are means that do not penetrate the outer wall, for example welding, soldering.

The front frame 2 is connected to the mounting element 7 by assembly means 6. In particular, the first peripheral edge 21 of the front frame 2 is connected to the mounting element 7. The assembly means 6 are in this case rivets, but may be other means such as welding, soldering, etc.

The terms assembly means and fastening means are to be understood as being equivalent. These two terms are used in order to distinguish between the assembly means 6, which serve for assembling or fastening the front frame 2 to the outer wall, and the fastening means which serve for assemble or fasten the mounting element 7 to the outer wall of the anterior part when the mounting element 7 is an added piece.

In this first example, the mounting element 7 is a bracket. The bracket comprises a first branch 70 that extends essentially parallel to the outer wall, a second branch 71 that extends essentially parallel to the front frame 2, and a connecting branch that connects the first branch 70 to the second branch 71. Thus, the first branch 70 and the second branch 71 extend essentially orthogonally to one another. The connecting branch connects the first branch 70 to the second branch 71, forming essentially a right angle, which makes it possible to avoid bending the front frame 2 in order to connect the front frame 2 to the outer wall. The first branch 70 of the bracket is fastened to the inner surface of the outer wall. The second branch 71 of the bracket is fastened to the first peripheral edge 21 of the front frame 2.

Figure 5:
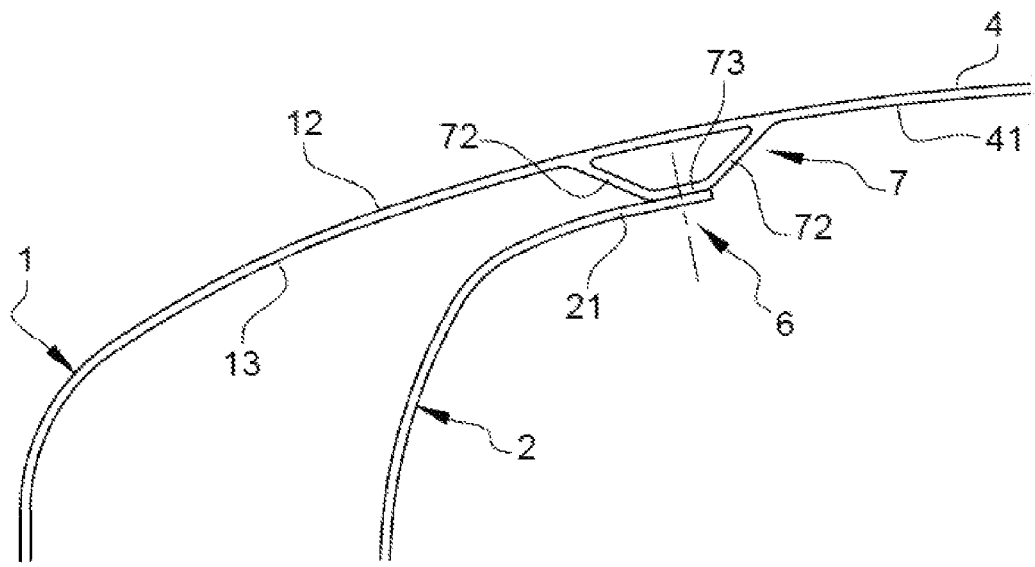
Figure 6:
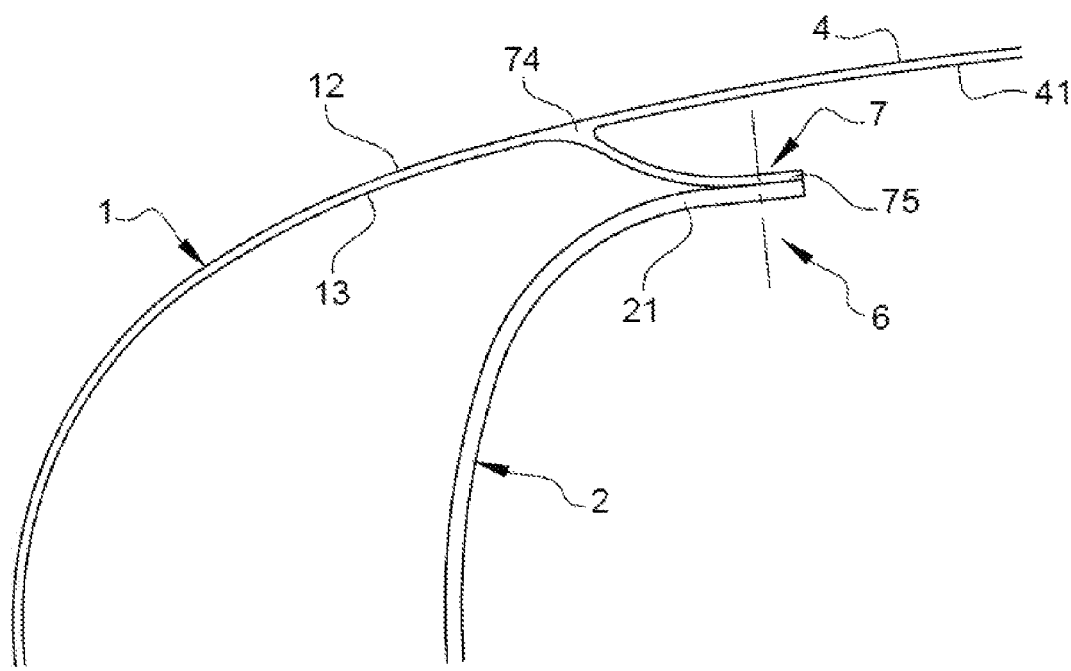

FIGS. 5 and 6 show other exemplary embodiments, in which the mounting element 7 is also an added piece.

In particular, the mounting element 7 of the example of FIG. 5 is a stiffener element. Stiffener element is to be understood as an element that serves to strengthen or stiffen the structure of the outer wall. In this case, the stiffener element is a hollow element comprising a core 73 that is extended on either side by two wings 72 and two soles each extending the two wings 72. The core 73 and the two wings 72 together have a trapezoidal cross section. The soles extend essentially parallel to the core 73. The core 73 and the soles extend parallel to the outer wall. The soles of the stiffener element are fastened to the inner surface of the outer wall. The first peripheral edge 21 of the front frame 2 is fastened to the core 73 of the stiffener element by fastening means.

In another exemplary embodiment, the mounting element 7 is formed in one piece with the lip 1 or the outer panel 4, for example by machining, or additive manufacturing, in particular 3D printing. In other words, the mounting element 7 and the lip 1 may form a single piece. Equally, the mounting element 7 and the outer panel 4 may form a single piece. Alternatively, the mounting element 7, the lip 1 and the outer panel 4 may form a single piece.

By way of non-limiting example, when the lip 1 is obtained by machining, a connecting tab can for example be directly integrated. This example is illustrated in particular in FIG. 6, where the mounting element 7 is a fastening tab. The lip 1 is therefore Y-shaped. A first end 74 of the fastening tab is fastened to the inner surface of the outer wall. The first peripheral edge 21 of the front frame 2 is fastened to a second end 75 of the fastening tab.

Figure 7:
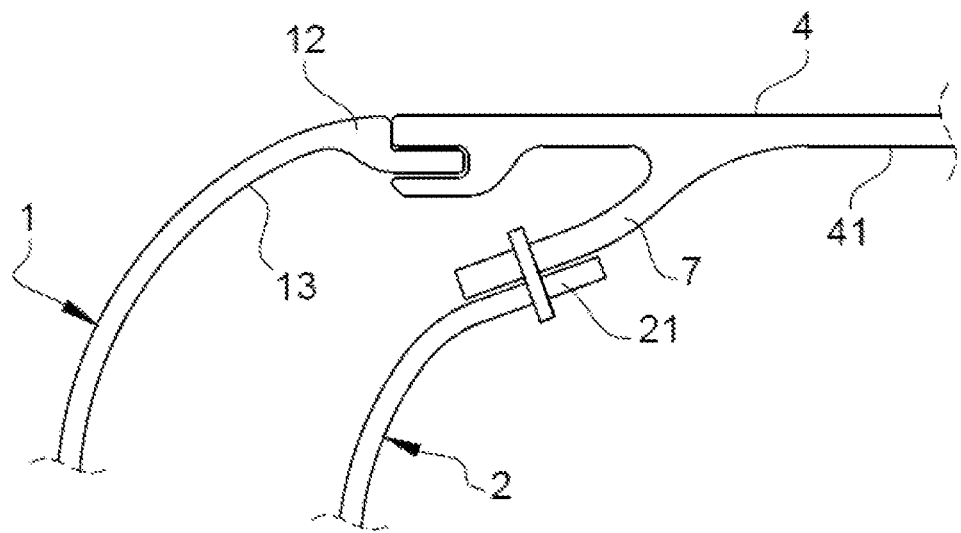

In a similar example illustrated in FIG. 7, the connecting tab may be formed in the outer panel 4 rather than the lip 1. The outer panel is then Y-shaped. In the illustrated embodiment, the lip 1 and the outer panel are furthermore assembled with one another by nesting.

The larger the mounting element 7, the more the assembly means 6 between the front frame 2 and the outer wall are remote from the outer surface of the nacelle. As a result, the risk of deformation is limited by using a relatively large mounting element since the mounting element serves to react certain mechanical stresses applied at the front frame and the connections between the front frame and the mounting element 7.

Figure 8:
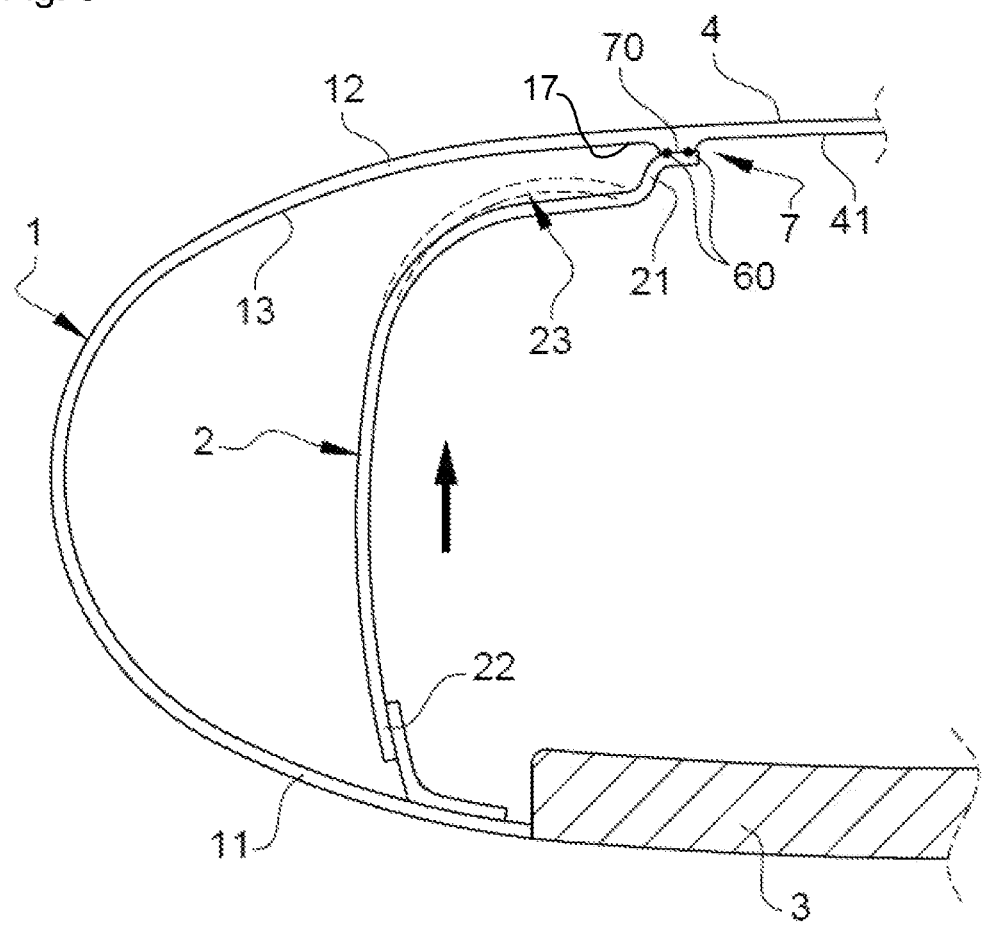

FIG. 8 shows an embodiment in which the mounting element 7 is formed by a region of increased thickness 70 projecting from the inner surface of the outer wall. The front frame 2 is connected to the region of increased thickness 70 of the outer wall. According to the examples, the region of increased thickness 70 can be formed in the inner surface 17 of the lip 1, or in the inner surface 41 of the outer panel 4, or in the inner surfaces 13, 40 of both. The connection is established over the entire perimeter of the peripheral edge 21 of the front frame 2.

The front frame 2, in particular the first peripheral edge 21 of the front frame 2, is assembled with the region of increased thickness 70 projecting from the inner surface of the outer wall by assembly means 6 that do not penetrate the outer wall, for example by welding or soldering.

In the example shown in FIG. 8, two rows of welding 60 serve to assemble the first peripheral edge 21 of the front frame 2 to the region of increased thickness 70. The region of increased thickness 70 is dimensioned in such a way as to prevent any deformation of the outer wall. The thickness of the outer panel 4 measured at the region of increased thickness 70 is greater than the thickness of the first peripheral edge 21 of the front frame 2. This also serves to avoid deformation of the outer wall.

Figure 9:
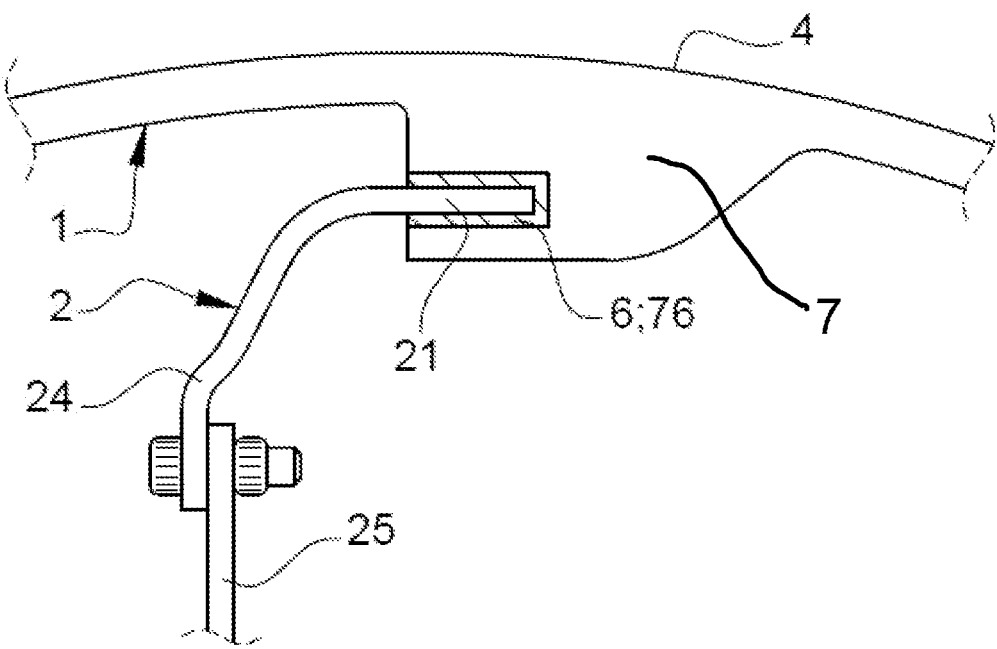

FIG. 9 shows an alternative example, in which the outer wall of the anterior part comprises a recess 76. In this case, the recess 76 is formed in the outer panel 4, inside the nacelle. The recess 76 and the first peripheral edge 21 have matching shapes and dimensions. In this case, the recess 76 has an essentially rectangular cross section and dimensions essentially equal to those of the front frame. Thus, the recess 76 is configured to receive and hold fast the first peripheral edge 21 of the front frame 2, by having matching shapes. In other words, the recess forms all or part of the assembly means 6.

In order to permit good holding of the front frame 2 in the recess, the first peripheral edge 21 may further be glued or welded to the outer wall. The glue, the adhesive or the weld may be applied to the interface between the first peripheral edge 21 and the recess 76.

The use of either gluing or welding depends, in particular, on the nature of the material of which the outer wall is made. Gluing or welding can be used for an outer wall made of metal. Gluing can also be used for an outer wall made of composite materials, but it must have mechanical properties similar to those of the resins of the composites. The adhesive must withstand the high temperatures to which the components of the propulsion assembly are subjected. The adhesive can then be polyepoxides or epoxy able to withstand temperatures up to 150° C., polyamide polymers able to withstand temperatures above 200° C., BMI polymers whose application temperature is between that of epoxy resins and that of polyamides, phthalonitrile polymers which retain their mechanical properties at temperatures between −54° C. and 343° C., or also cyanate ester resins having good compatibility with the other resins.

In all of the examples described above, the front frame 2 and the outer wall of the anterior part are connected to one another by assembly means 6 located inside the anterior part. Thus, the assembly means 6 do not penetrate the outer wall.

This serves to ensure continuity of the aerodynamic surface of the nacelle without disruption by fastenings. The flow of air over the outer surface of the nacelle is properly laminar and drag is reduced.

Although shown only in FIG. 8, in all of the above-described examples the second peripheral edge 22 of the front frame 2 is connected to the inner structure 3. The second peripheral edge 22 is connected for example by riveting. When the first peripheral edge 21 is connected to the outer wall by welding, the use of rivets at the second peripheral edge 22 permits good reacting of the forces in the front frame 2.

In one embodiment, the front frame 2 comprises at least two radial parts 24, 25. The radial parts 24, 25 are joined to one another by removable fastening elements, for example bolts. This permits mounting and removal of the front frame and thus facilitates access to the air intake, which is of great use for maintenance and repair of the propulsion assembly. This configuration in multiple radial parts is necessary when the first peripheral edge 21 of the front frame 2 cannot be disassembled or separated from the outer wall, for example for assembly by glued nesting as described with reference to FIG. 9.

Furthermore, the front frame 2, which is generally made of metal, is subjected to considerable thermal expansion owing to large variations in temperature. Specifically, the air inside the nacelle flows at a temperature close to 400° C., in particular in order to provide the de-icing function, while outside the nacelle the temperature of the air is close to negative values of the order of −50° C. The temperature difference between the inside and the outside of the nacelle causes the expansion of the front frame. FIG. 8 shows, schematically and in dotted lines, the expansion of the front frame 2.

In the example shown in this figure, the front frame 2 comprises an upper part 23 directly extending the first peripheral edge 21 joined to the outer wall. The upper part 23 extends essentially parallel to the longitudinal axis L. The front frame 2 therefore has contours essentially similar to the contours of the lip 1. The thickness of the upper part 23 is smaller than that of the rest of the front frame, and its length is between 20 mm and 100 mm. The smaller thickness is between 0.5 and 1 mm, preferably of the order of 0.8 mm Thus, the upper part 23 has little curvature compared to the rest of the front frame 2. The upper part 23, having a small thickness and little curvature, thus serves as an expansion buffer since the expansion or deformation of the front frame occurs primarily at this location.

The front frame 2, having an upper part 23 formed in this manner, expands without affecting the outer wall. This is not the case for the front frames of the prior art which, owing to the fact that they are connected by riveting to the outer wall, deform the latter when they expand, which changes the aerodynamic profile of the nacelle.

Thus, the front frame 2 can deform with no impact on the aerodynamic profile of the nacelle. This also improves the laminar nature of the air flow over the outer surface of the nacelle, in particular at the outer surface of the anterior part thereof.

The present invention proposes a structure for a nacelle anterior part, and, in particular, a connection between the front frame and the outer wall of the anterior part, which serves to ensure continuity of the aerodynamic surface of the anterior part, and consequently a laminar flow of air over the surface of the nacelle.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anterior part of a nacelle of a propulsion assembly of an aircraft, said anterior part having a front end allowing air to enter and a rear end intended to be connected to a remainder of the nacelle, said anterior part comprising:
   an air intake lip disposed at said front end and comprising a leading edge and an outer part and an inner part that are delimited by said leading edge,
   an outer panel that extends the outer part of the air intake lip, said outer panel and said outer part of the air intake lip together forming an outer wall of the anterior part, said outer wall having an aerodynamic outer surface,
   an inner surface and a mounting element extending from said inner surface, said mounting element formed as a bracket, an inner structure extending the inner part of the air intake lip,
   a front frame disposed behind the air intake lip and connecting said outer wall to said air intake lip or to said inner structure, said front frame comprising a first peripheral edge connected to said outer wall, and a second peripheral edge connected to at least one of said inner structure or the inner part of the air intake lip,
   wherein said front frame and said bracket are connected to one another by assembly means located in an inner zone of said anterior part such that said assembly means are spaced from said inner surface, and
   wherein said aerodynamic outer surface is continuous such that said outer surface is not disrupted by fastenings or an interface between said outer panel and said outer part of the intake lip,
   wherein the bracket extends from a first end with a first branch connected to said outer wall to a second end with a second branch connected to said front frame, the first branch parallel with said outer wall and the second branch parallel with said front frame such that the first branch and the second branch are substantially orthogonal and are not parallel with each other.

2. The nacelle anterior part according to claim 1, in which said outer wall comprises the mounting element extending inside the anterior part and projecting from an inner surface of the anterior part, said first peripheral edge of the front frame being connected to said mounting element by said assembly means.

3. The nacelle anterior part according to claim 2, in which the bracket is connected to said outer wall by non-penetrating fastening means.

4. The nacelle anterior part according to claim 1, in which the assembly means are added fastening elements.

5. The nacelle anterior part according to claim 4, in which the assembly means are rivets.

6. The nacelle anterior part according to claim 1, in which the assembly means comprise welding, soldering or gluing.

7. A nacelle of an aircraft propulsion unit, comprising an anterior part according to claim 1.

8. An anterior part of a nacelle of a propulsion assembly of an aircraft, said anterior part having a front end allowing air to enter and a rear end configured to be connected to a remainder of the nacelle, said anterior part comprising:
   an air intake lip disposed at said front end and comprising a leading edge and an outer part and an inner part that are delimited by said leading edge,
   an outer panel that extends the outer part of the air intake lip, said outer panel and said outer part of the air intake lip together forming an outer wall of the anterior part, said outer wall having an aerodynamic outer surface,
   an inner surface and a mounting element extending from said inner surface, an inner structure extending the inner part of the air intake lip,
   a front frame disposed behind the air intake lip and connecting said outer wall to said air intake lip or to said inner structure, said front frame comprising a first peripheral edge connected to said outer wall, and a second peripheral edge connected to at least one of said inner structure or to the inner part of the air intake lip,
   wherein said mounting element is formed in one piece with the air intake lip, the outer panel, or both, said front frame and the mounting element of said outer wall of the anterior part being connected to one another by assembly means located in an inner zone of said anterior part such that said assembly means are spaced from said inner surface,
   wherein said aerodynamic outer surface is continuous such that said outer surface is not disrupted by fastenings or an interface between said outer panel and said outer part of the intake lip,
   wherein said mounting element is a connecting tab formed in the outer panel having a Y shape and the air intake lip and the outer panel being assembled by nesting.

9. The nacelle anterior part according to claim 8, in which said outer wall comprising the mounting element extends inside the anterior part and projects from an inner surface of the anterior part, said first peripheral edge of the front frame being connected to said mounting element by said assembly means.

10. The nacelle anterior part according to claim 8, in which the mounting element is a bracket, a stiffener element or a fastening tab.

11. The nacelle anterior part according to claim 8, in which the assembly means are added fastening elements.

12. The nacelle anterior part according to claim 8, in which the assembly means are rivets.

13. The nacelle anterior part according to claim 8, in which the first peripheral edge of the front frame is connected to the outer wall by welding, soldering or gluing, the welding, soldering or gluing forming said assembly means.

14. The nacelle anterior part according to claim 8, in which the front frame comprises at least two radial parts, said radial parts being joined to one another by removable fastening elements.

15. An anterior part of a nacelle of a propulsion assembly of an aircraft, said anterior part having a front end allowing air to enter and a rear end configured to be connected to a remainder of the nacelle, said anterior part comprising:
   an air intake lip disposed at said front end and comprising a leading edge and an outer part and an inner part that are delimited by said leading edge,
   an outer panel that extends the outer part of the air intake lip, said outer panel and said outer part of the air intake lip together forming an outer wall of the anterior part, said outer wall having an aerodynamic outer surface, an inner surface and a mounting element extending from said inner surface, an inner structure extending the inner part of the air intake lip, a front frame disposed behind the air intake lip and connecting said outer wall to said air intake lip or to said inner structure, said front frame comprising a first peripheral edge connected to said outer wall, and a second peripheral edge connected to at least one of said inner structure or to the inner part of the air intake lip, wherein said mounting element is formed in one piece with the air intake lip, the outer panel, or both, said front frame and the mounting element of said outer wall of the anterior part being connected to one another by assembly means located in an inner zone of said anterior part such that said assembly means are spaced from said inner surface, wherein said aerodynamic outer surface is continuous such that said outer surface is not disrupted by fastenings or an interface between said outer panel and said outer part of the intake lip, wherein the front frame comprises at least two radial parts, said radial parts being joined to one another by removable fastening elements, and wherein one of the at least two radial parts being permanently attached to a recess formed in the outer wall.

* * * * *